United States Patent
Ertl

(10) Patent No.: US 8,656,644 B2
(45) Date of Patent: Feb. 25, 2014

(54) TRIM STRIP

(75) Inventor: Harald Ertl, Eichenau (DE)

(73) Assignee: Cadea Gesellschaft fur Anwendung und Realisierung Computerunterstutzter Systeme mbH, Eichenau (DE)

( * ) Notice: Subject to any disclaimer, the term of this patent is extended or adjusted under 35 U.S.C. 154(b) by 467 days.

(21) Appl. No.: 12/599,660

(22) PCT Filed: Aug. 11, 2008

(86) PCT No.: PCT/EP2008/006610
§ 371 (c)(1),
(2), (4) Date: Jul. 8, 2010

(87) PCT Pub. No.: WO2009/033539
PCT Pub. Date: Mar. 19, 2009

(65) Prior Publication Data
US 2010/0300002 A1   Dec. 2, 2010

(30) Foreign Application Priority Data

Sep. 11, 2007 (DE) .......................... 10 2007 043 218

(51) Int. Cl.
*E05F 11/38* (2006.01)
(52) U.S. Cl.
USPC ............................ 49/377; 49/490.1; 49/492.1
(58) Field of Classification Search
USPC .................. 49/377, 372, 490.1, 492.1, 493.1
See application file for complete search history.

(56) References Cited

U.S. PATENT DOCUMENTS

| | | | | | |
|---|---|---|---|---|---|
| 5,353,549 | A | * | 10/1994 | Henderson et al. | 49/490.1 |
| 5,363,537 | A | * | 11/1994 | Schneider et al. | 24/289 |
| 5,433,038 | A | * | 7/1995 | Dupuy | 49/377 |

(Continued)

FOREIGN PATENT DOCUMENTS

| DE | 34 10 193 A1 | 9/1985 |
|---|---|---|
| DE | 43 39 033 A1 | 5/1995 |

(Continued)

OTHER PUBLICATIONS

PCT International Search Report issued by PCT International Searching Authority and mailed Dec. 3, 2008 in connection with the PCT International Application No. PCT/EP2008/006610 (3 Pages).

(Continued)

*Primary Examiner* — Gregory J. Strimbu
(74) *Attorney, Agent, or Firm* — Robert P. Michal; Lucas & Mercanti, LLP

(57) ABSTRACT

A trim strip for the edge of a window channel for an automotive side window which is adapted to be lowered into the window channel. The trim strip includes a rigid fixing profile having a U-shaped housing, an at least partly rubber elastic seal having a seal lip cooperating with the side window and a seal profile which is adapted to be inserted into the housing, and at least one groove which is arranged in the U-shaped housing and which is provided with at least one undercut portion that is engaged by a rib arranged on the seal profile. The groove is arranged in the transverse web of the U-shaped housing. Thus, the trim strip permits an easier introduction of the seal profile in the fixing profile and a secure retention of the seal profile in the fixing profile.

8 Claims, 2 Drawing Sheets

(56) References Cited

U.S. PATENT DOCUMENTS

| | | | |
|---|---|---|---|
| 5,671,565 A * | 9/1997 | Furuse | 49/377 |
| 6,321,490 B1 * | 11/2001 | Vance | 49/377 |
| 6,820,919 B2 * | 11/2004 | Florentin et al. | 296/146.6 |
| 2005/0235569 A1 * | 10/2005 | Shumulinskiy | 49/377 |

FOREIGN PATENT DOCUMENTS

| | | |
|---|---|---|
| DE | 199 22 749 A1 | 11/2000 |
| EP | 0 295 989 A | 12/1988 |
| EP | 0443345 A2 | 8/1991 |
| FR | 2 453 041 A | 10/1980 |
| FR | 2 727 182 A | 5/1996 |
| GB | 2 369 849 A | 6/2002 |
| JP | 51-136218 A | 11/1976 |
| JP | 2006-182215 A | 7/2006 |
| WO | 98/21061 A1 | 5/1998 |

OTHER PUBLICATIONS

Office Action (Notice of Reasons for Rejection) mailed Feb. 19, 2013 in related Japanese Application No. 2010-523294 and English translation thereof (6 pages).

* cited by examiner

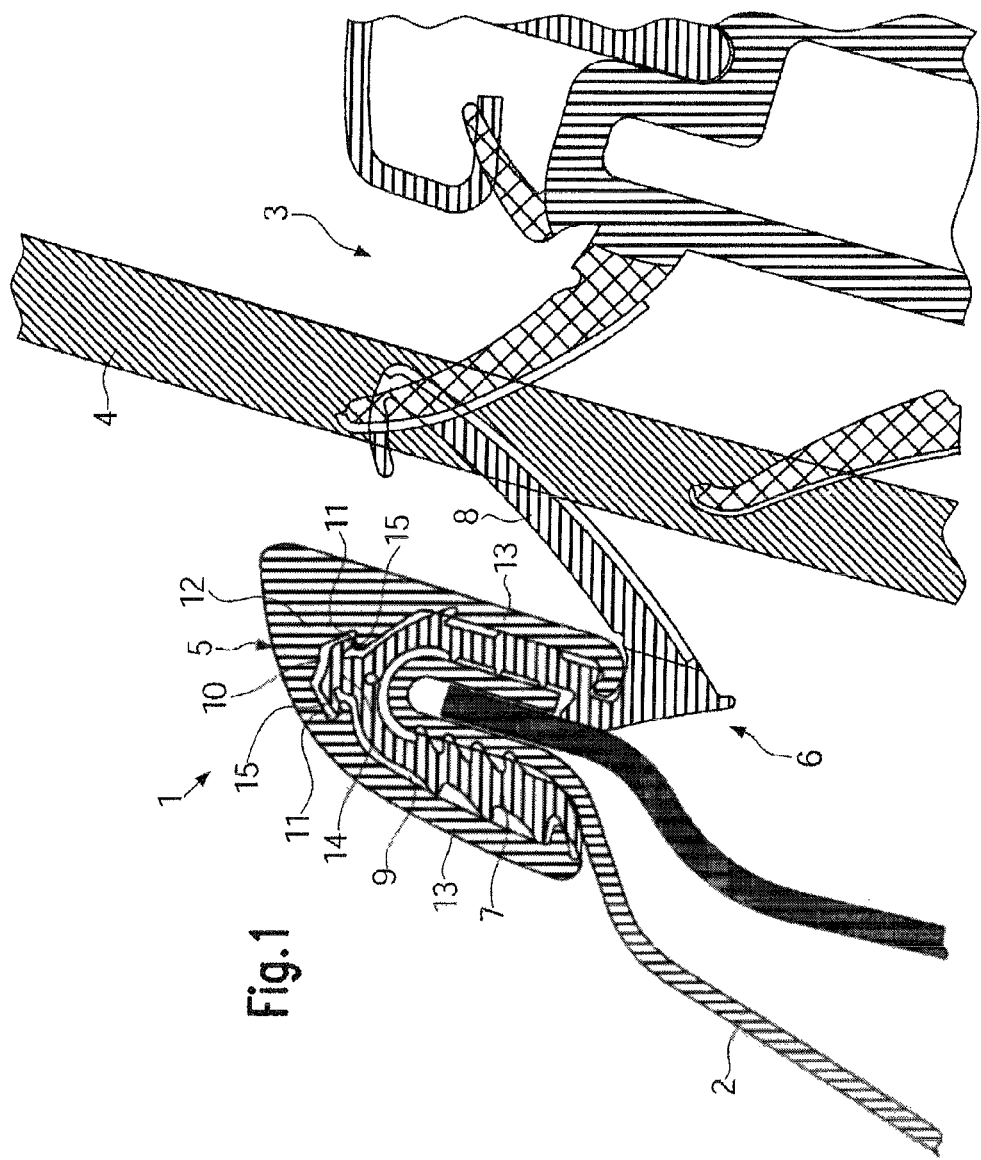

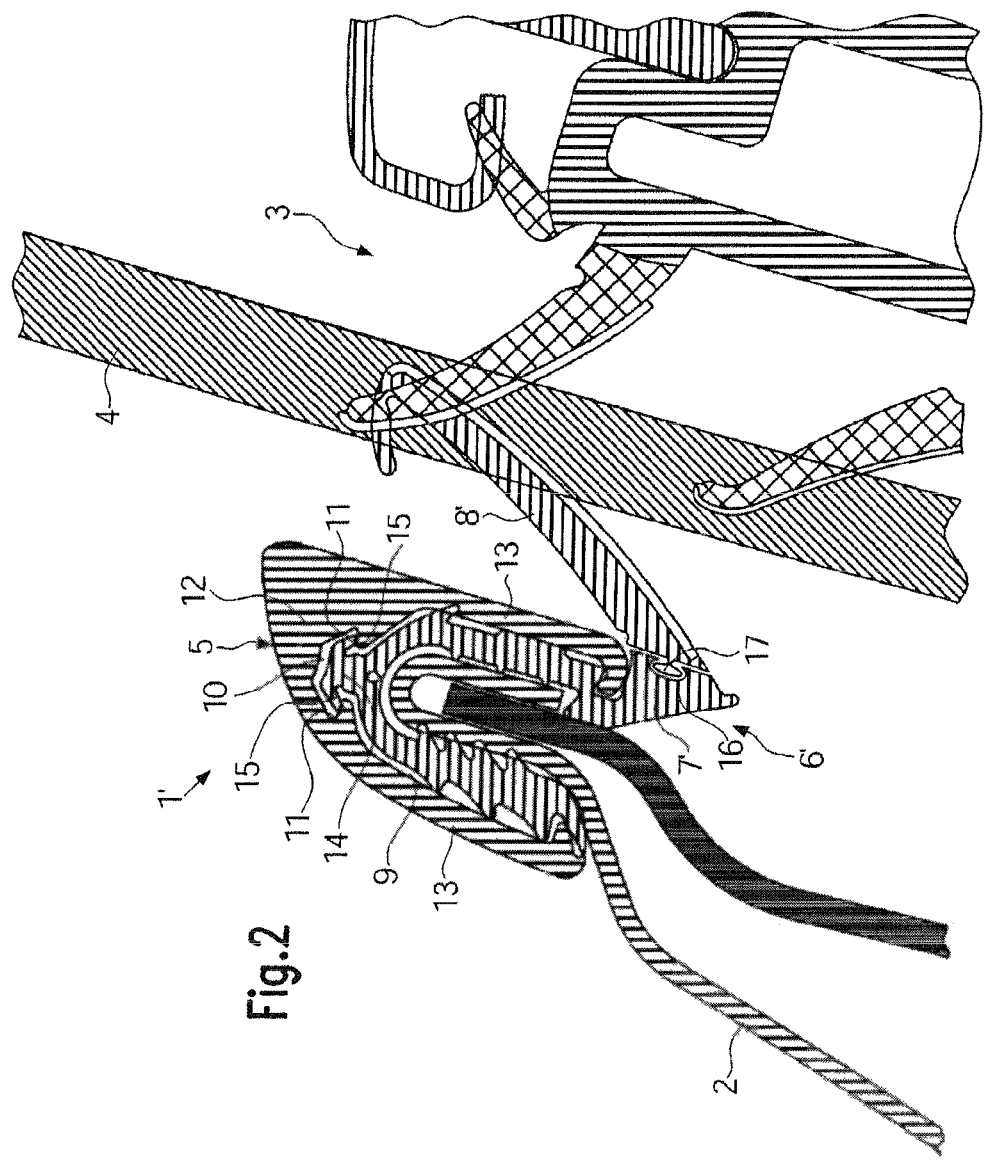

TRIM STRIP

This application is a U.S. National Phase Application under 35 USC 371 of International Application PCT/EP2008/006610 filed Aug. 11, 2008, which claims priority from German Application No. DE 10 2007 043 218.8 filed Sep. 11, 2007, the entire disclosure of each of which is incorporated herein by reference.

The invention relates to a trim strip for the edge of a window channel for an automotive side window which is adapted to be lowered into the window channel, said trim strip comprising a rigid fixing profile having a U-shaped housing, an at least partly rubber elastic seal having a seal lip cooperating with the side window and a seal profile which is adapted to be inserted into the housing, and at least one groove which is arranged in the U-shaped housing and which is provided with at least one undercut portion that is engaged by a rib arranged on the seal profile.

Such a trim strip is pushed onto the door frame of the respective door of the passenger car adjacent the window channel. Various possibilities of fixing the trim strip to the door frame are known. It is, for example, possible to use seal profiles with a metal insert which are clipped onto the door frame so as to reliably fix the trim strip on the door frame.

Another trim strip making use of a different fixing principle is known from DE 34 10 193 A1. Also this trim strip is provided with a U-shaped metal profile, i.e. fixing profile, in which a U-shaped sealing profile, i.e. clamping profile, and a seal lip made of elastomeric material are held by means of a positive and/or non-positive connection. The seal profile has substantially the same shape as the U-shaped metal profile, i.e. it is also U-shaped, but it does not comprise any metal insert. When the trim strip is being assembled, the seal profile is fitted into the fixing profile from below. In the course of this process, the lower ends of the legs of the seal profile are received in openings of the fixing profile, which are also arranged at the lower end of the legs of the U-shaped fixing profile, so that the seal profile will be retained in the fixing profile.

It follows that the sealing or clamping profile must be compressed, introduced into the U-shaped fixing profile from below and, subsequently, it must be spread until the ends of the legs of the seal profile slip into the openings provided in the fixing profile. The seal lip is also fitted into the metal or fixing profile, and the assembled trim strip is then pushed onto the door frame. The metal or fixing profile imparts the necessary rigidity to the trim strip.

This trim strip is disadvantageous insofar as introduction of the seal profile into the metallic fixing profile is complicated. In this respect, it must be carefully checked that the seal profile is correctly positioned in the fixing profile and that it is prevented from slipping out.

It is therefore the object of the present invention to provide an improved trim strip which eliminates the drawbacks of the prior art. The present invention especially aims at providing a trim strip which permits easy introduction of the seal profile in the fixing profile and secure retention of the seal profile in the fixing profile.

To this end, the invention is so conceived that the groove is arranged in the transverse web of the U-shaped housing.

On the basis of this structural design, the seal profile can be fixed very easily to, or rather in the fixing profile. It will only be necessary to insert the seal profile into the fixing profile until the rib of the seal profile engages the groove of the fixing profile. Spreading of the seal profile or the like is not necessary. The desired stability of the trim strip is provided by the rigid fixing profile. Due to the seal profile, a leak proof connection is established between the fixing profile and the frame of the vehicle door. No additional fixing elements, such as clips or the like, are necessary for holding the trim strip on the door frame. Thanks to the rigid fixing profile, the seal need not include any rigid elements, such as a metal insert. Hence, the trim strip can be attached easily to the frame of the vehicle door.

According to a preferred embodiment, the groove in the housing of the fixing profile can be dovetailed, and the rib of the seal profile can be provided with lateral projections which engage the dovetailed groove. This shape of the groove allows easy introduction of the rib of the seal profile into the groove of the housing. Since the rib is in engagement with the groove on both sides thereof, the rib will be retained firmly in the groove.

One variant is so conceived that the seal lip cooperating with the side window is arranged in the non-visible area in the window channel. This has the effect that the soft seal lip is protected against external influences by the fixing profile. In addition, the seal lip cannot be seen from outside, whereby an attractive optics of the trim strip and of the vehicle door is achieved.

An expedient embodiment may also be so conceived that the seal profile encloses the ends of the two legs of the U-shaped housing of the fixing profile. This allows easy mounting of the trim strip on the door frame, and scratches will be avoided. The use of additional protection aids against scratches can therefore be dispensed with. Since the seal profile is arranged between the door frame and the fixing profile, a contact between the door frame and the fixing profile will be avoided. If metallic fixing profiles should be used, contact corrosion will be avoided.

A preferred embodiment can be so conceived that the seal profile and the seal lip consist of different materials. Hence, the seal lip and the seal profile can have assigned thereto different desired characteristics. The seal lip can e.g. be implemented such that it is comparatively soft so as to protect the window.

According to one embodiment, the seal profile and the seal lip can be formed integrally with one another. Hence, the seal will comprise only one component, and, consequently, the fixing profile and the seal can be assembled more easily. The seal lip and the seal profile will therefore be secured to the fixing profile in the same operating step. This seal, which consist of different materials, can be produced very easily by means of extrusion.

The invention may, however, also be so conceived that the seal lip is fitted into the seal profile. This allows a simple connection between the seal lip and the seal profile in cases in which different materials are used for the seal profile and the seal lip.

One variant can be so conceived that, when seen in the longitudinal direction, the fixing profile is closed at both ends thereof, and that the rib of the seal profile is clipped into the groove provided in the housing of the fixing profile. The seal profile can then easily be pushed into the fixing profile from below until the rib engages the groove, whereby a secure retention of the seal profile in the fixing profile will be obtained. Due to the fact that the fixing profile is closed at both ends, a good sealing effect can be produced at both ends and an optically attractive overall impression of the trim strip will be accomplished.

The invention may, however, also be so conceived that, when seen in the longitudinal direction, the fixing profile is open at both ends thereof, and that the rib of the seal profile is threaded into the housing of the fixing profile. Also in this case, the seal profile can be secured in position in the fixing profile without any difficulties whatsoever.

In the following, embodiments will be described in more detail with reference to a drawing, in which:

FIG. 1 shows a section through a trim strip attached to a door frame, and

FIG. 2 shows a section though another embodiment of a trim strip attached to a door frame.

FIG. 1 shows a section through a trim strip 1 that has bee pushed onto the door frame 2 of a passenger car. The door frame 2 defines a window channel 3 into which a side window 4 of the passenger car can be lowered. The trim strip 1 seals the window channel 3 off from the surroundings and is also provided for decorative purposes.

The trim strip 1 comprises a fixing profile 5 and a seal 6 having a seal profile 7 and a seal lip 8. The fixing profile 5 is preferably made of a rigid material, e.g. metal such as aluminum or steel. It is, however, also imaginable to produce the fixing profile 5 from a rigid plastic material. The seal 6 is at least partly rubber elastic. The seal profile 7 and the seal lip 8 may consist of different materials.

The fixing profile 5 has a U-shaped housing 9 into which the seal profile 7 of the seal 6 is inserted. The U-shaped housing 9 of the fixing profile 5 has provided therein a groove 10 having at least one undercut portion 11. The groove 10 is arranged in the U-shaped housing 9 in the transverse web 12 between the two legs 13.

The seal profile 7 of the seal 6 has provided thereon a rib 14 which, in the assembled condition of the trim strip 1, engages the groove 10 in the fixing profile 5 and is in engagement with the undercut portions 11 so that the seal 6 will be fixedly retained in the fixing profile 5.

In order to allow an efficient and reliable fixing of the seal 6 in the fixing profile 5, the groove 10 is preferably dovetailed. The rib 14 of the seal profile 7 has lateral projections 15 which engage the dovetailed groove 10 and come to lie in the undercut portions 11.

The seal lip 8 is preferably arranged in such a way that it is covered by the fixing profile 5 from outside and is thus arranged in the non-visible area in the window channel 3. The seal profile 7 is implemented such that the two lower ends of the legs 13 of the U-shaped housing 9 of the fixing profile 5 are enclosed by the seal profile 7, whereby the fixing profile 5 is prevented from resting directly on the door frame 2. When the fixing profile 5 is made of a metallic material, contact corrosion can be avoided in this way, and scratches will be avoided during mounting of the trim strip 1 on the door frame 2.

As can be seen in FIG. 1, the seal 6 may configured as an integral element so that the seal profile 7 and the seal lip 8 define one component. The seal lip 8 and the seal profile 7 are preferably made of different materials. Easy production of a one-piece seal is nevertheless possible by means of extrusion.

FIG. 2 shows another embodiment of the trim strip 1'. The trim strip according to FIG. 2 corresponds essentially to the trim strip described in FIG. 1. Hence, only the differences between these two trim strips 1, 1' will be described in the following.

The trim strip 1' shown in FIG. 2 comprises a two-part seal 6'. The seal profile 7' and the seal lip 8' are essentially identical with the seal lip 8 and the seal profile 7. The seal profile 7' is, however, provided with a groove 16 which is engaged by a rib 17 of the seal lip 8. Hence, the seal lip 8' can easily be fitted into the seal profile 7' and, consequently, also be replaced easily.

The fixing profile 5 may be implemented such that it is closed at both ends thereof, when seen in the longitudinal direction. In this case, the rib 14 of the seal profile 7, 7' is clipped into the groove 10 in the U-shaped housing 9 of the fixing profile 5.

The fixing profile 5 may, however, also be implemented such that it is open at both ends thereof, when seen in the longitudinal direction, and that the rib 14 of the seal profile 7, 7' is threaded into the groove 10 of the U-shaped housing 9 of the fixing profile 5.

Making reference to the figures, the mounting of the trim strip 1, 1' on the door frame 2 will be described briefly herein below.

In a first step, the seal 6, 6' with the seal profile 7, 7' and the seal lip 8, 8' is introduced into the fixing profile 5 from below until the lateral projections 15 of the rib 14 of the seal profile 7, 7' engage the undercut portions 11 of the groove 10 in the fixing profile 5.

In cases where the fixing profile 5 is open, when seen in the longitudinal direction, the seal 6, 6' can also be threaded into the fixing profile 5. In so doing, care should be taken that the projections 15 of the rib 14 of the fixing profile 7, 7' com to lie in the undercut portions 11 of the groove 10 of the fixing profile 5.

When a two-part seal 6' is used, the seal lip 8' can be secured in position in the seal profile 7' before or after said seal profile 7' is mounted.

The thus assembled trim strip 1, 1' is then attached from above onto a fold of the door frame 2 which is arranged adjacent the window channel 3. Due to the rigid fixing profile 5, the seal 6, 6' is pressed onto the fold of the door frame 2 so that a firm connection will be established between the trim strip 1, 1' and the door frame 2.

The seal profile 7' may also be configured as a coextrudate insofar as the flexible parts consist of a soft plastic material and the shape-establishing parts consist of a firm plastic material.

Although the trim strip has been described in connection with a window channel of a lower able window, it can also be used for stationary windows.

The invention claimed is:

1. A trim strip for an edge of a window channel for an automotive side window which is adapted to move relative to the window channel, said trim strip comprising a fixing profile having a U-shaped housing, an at least partly rubber elastic seal having a seal lip cooperating with the side window and a seal profile which is inserted into the housing, and at least one groove which is arranged in the U-shaped housing and is engaged by a rib of the seal profile, wherein the groove is arranged in a transverse web of the U-shaped housing, and wherein the rib includes at least two projections extending in opposite directions away from each other and operatively engaging undercut portions in the groove of the U-shaped housing.

2. A trim strip according to claim 1, wherein the seal lip cooperating with the side window is arranged in the window channel.

3. A trim strip according to claim 1, wherein the u-shaped housing has two legs each having an end and the seal profile at least partially encloses the ends of the two legs.

4. A trim strip according to claim 1, wherein the seal profile and the seal lip comprise different materials.

5. A trim strip according to claim 1, wherein the seal profile and the seal lip are formed integrally with one another.

6. A trim strip according to claim 1, wherein the seal lip is fitted onto the seal profile.

7. A trim strip according to claim 1, wherein when seen in its longitudinal direction, the fixing profile is closed at both ends thereof, and the rib of the seal profile is clipped into the groove of the housing.

8. A trim strip according to claim 1, wherein when seen in its longitudinal direction, the fixing profile is open at both ends thereof, and the rib of the seal profile is pulled into the groove of the housing.

* * * * *

UNITED STATES PATENT AND TRADEMARK OFFICE
CERTIFICATE OF CORRECTION

PATENT NO.      : 8,656,644 B2                                                    Page 1 of 1
APPLICATION NO. : 12/599660
DATED           : February 25, 2014
INVENTOR(S)     : Harald Ertl It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 589 days.

Signed and Sealed this

Twenty-ninth Day of September, 2015

Michelle K. Lee
*Director of the United States Patent and Trademark Office*